United States Patent Office 2,940,534
Patented June 14, 1960

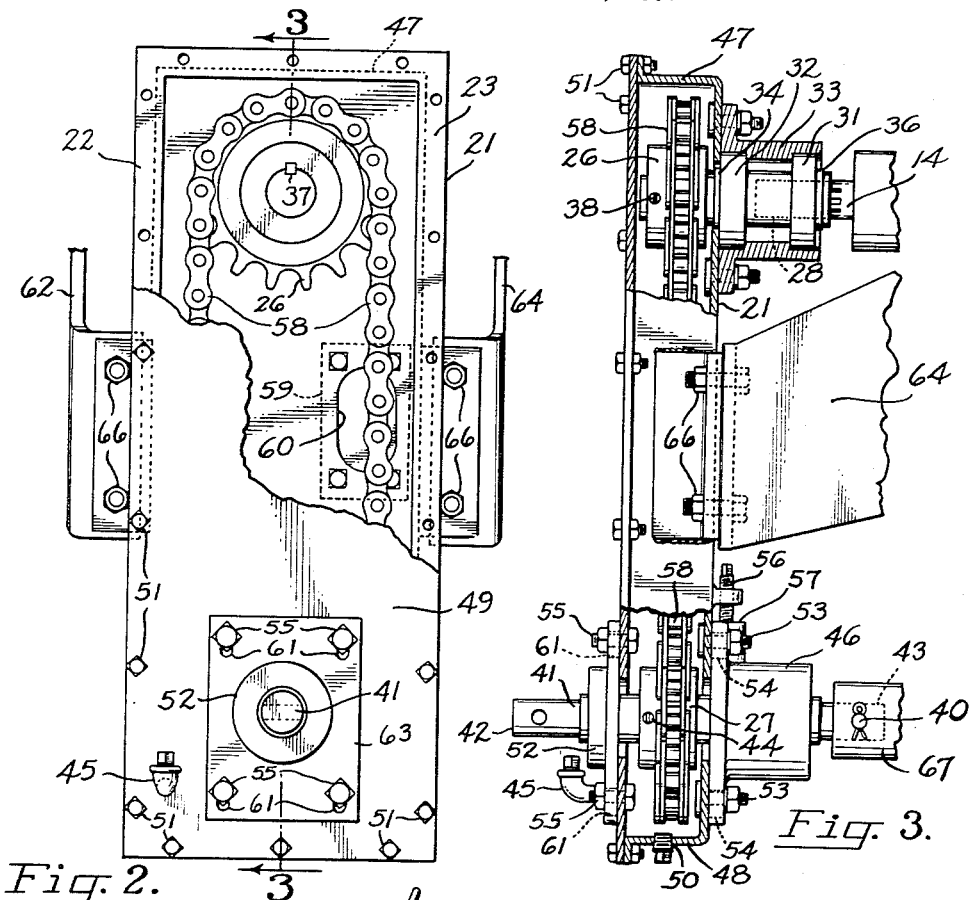
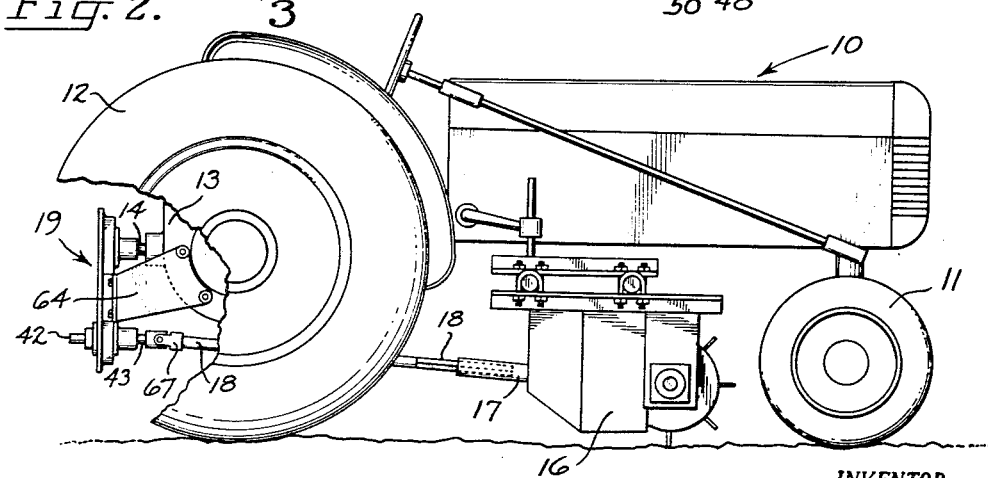
Fig. 2.  Fig. 3.  Fig. 1.
INVENTOR.
Robert C. Chattin

2,940,534

POWER TAKE-OFF MECHANISM

Robert C. Chattin, Box 1644, Boise, Idaho

Filed Feb. 11, 1957, Ser. No. 639,361

3 Claims. (Cl. 180—53)

This invention relates to power take-off mechanism for tractors and the like and more particularly to power transfer mechanism interconnecting a power take-off shaft of a tractor and a rotatably driven groundworking tool carried by the tractor.

The principal object of this invention is to provide a power transfer mechanism providing a positive power linkage between a power take-off shaft and a groundworking tool carried by a tractor characterized by a rigid construction which enables the mechanism to resist stresses and strains imposed thereon without appreciable transfer of these shocks to the power take-off shaft and without misalignment of the various parts in the mechanism.

Illustrative of the groundworking tools advantageously driven by the power transfer mechanism of this invention are the so-called "mulchers" or cultivator attachments of the general type illustrated in United States patents to Grey, 2,232,523, Ariens, 2,364,043, and Chattin, 2,694,967. These mulchers or cultivator attachments are mounted forwardly of the traction wheels of a tractor and are suspended from the tractor body for the purpose of cultivating row crops straddled by the tractor. While the power transfer mechanism of this invention has particular utility in connection with groundworking implements of this description, it will be seen from the description below that the invention may also be used advantageously with implements drawn rearwardly of a tractor and fastened to the tractor by means of conventional drawbar attachments.

Groundworking tools such as the cultivators described above undergo a considerable amount of jarring and shaking in progressing through various soil conditions encountered. Shocks and vibrational movement are also created when the depth of the soil being worked is abruptly changed as, for instance, when the front or the rear wheels of a tractor are suddenly raised or lowered as the tractor progresses over uneven ground. When a positive power linkage is employed between the power take-off shaft and the groundworking tool, the vibrational movement created in the groundworking tool tends to be transmitted from the groundworking tool to the power take-off shaft of a tractor. The vibrational movement may be either in an up-and-down direction, from one side of the tractor to the other, or longitudinally of the tractor. By employing universal joints in the power transfer mechanism between the power take-off shaft and groundworking tool, much of the vertical and lateral vibrations are absorbed before being transmitted to the power take-off shaft. However, such a construction is not effective to prevent longitudinal vibrations from being transmitted to the power take-off shaft.

Vibrations created in a groundworking tool during operation of the tool have been extremely troublesome. Power transfer mechanisms interconnecting a power take-off shaft and a rotatable groundworking tool which are supported to any appreciable extent on the power take-off shaft tend to transmit the shocks created in the tool directly to the power take-off shaft of the tractor. This has resulted in the imposition of twists and strains on the power take-off shaft and, as a consequence, premature failure of the shaft. Other mechanisms employing extensive bracing structure have been characterized by an intricate construction and complexity which has contributed to the expense of the mechanism and created installation difficulties. Other mechanisms have utilized flexible power transmitting means such as chains or belts for transmitting drive from the power take-off shaft to the groundworking tool. With constructions of this type, the sprockets or pulleys which support the chains or belts are continually subjected to vibrational movement causing shifting of the sprocket or belt centers. This may result in slippage if a belt is employed or the creation of excessive stresses in the chain or belt. Further, as in the case when a chain is used, shifting of a sprocket supporting the chain in a direction parallel to the axis of the sprocket produces bending and shearing stresses in the chain parts and premature failure in the chain.

The difficulties hereinabove described may be taken care of quite satisfactorily by providing a power transfer mechanism between the power take-off shaft of a tractor and the groundworking tool which includes a power transfer unit comprised of a rigid frame suspended vertically from the power take-off shaft at the rear of a tractor and braced to the tractor by means of bracing members or bracing plates secured directly to transmission housing structure or other rigid structure carried at the rear of the tractor. The power transfer unit is provided support by a pair of laterally spaced bracing flanges extending vertically therealong inhibiting twisting of the frame in a vertical plane longitudinally of the tractor. A drive sprocket mounted intermediate the bracing flanges at the upper end of the transfer unit is connected to the power take-off shaft of the tractor, and a driven sprocket for driving the groundworking tool is mounted intermediate the bracing flanges at the lower end of the transfer unit. The frame for the power transfer unit is braced against bending longitudinally of the tractor and holds the centers of the drive and driven sprockets in a fixed position against movement vertically toward and away from each other and prevents shifting relative to each other longitudinally of the tractor. The transfer unit may be mounted on a tractor through a pair of brackets affixed to housing structure of the tractor and extending rearwardly of the tractor to opposite sides, respectively, of the transfer unit frame. The support for the power transfer unit may be of the cantilever type with the driven sprocket disposed vertically below the connections between the bracing plates and the transfer unit frame, the rigid bracing flanges inhibiting twisting of the frame.

The drive and driven sprockets are mounted rearwardly of the frame for the transfer unit so that the frame provides a shield for deflecting dirt and dust from mechanical parts of the transfer unit. In the preferred embodiment of this invention, the frame for the transfer unit takes the form of an enclosed casing and includes a cover member secured to the bracing flanges and sealing the interior of the unit from dirt and dust. When a cover member is employed, a lubricant for the transfer unit parts may be maintained within the cavity defined by the frame and cover member. A drive chain reeved about the drive and driven sprockets transmits power from the power take-off shaft to the driven sprocket, and means are included for vertical adjustment of the driven sprocket, thereby to adjust the tension in the drive chain.

It is an object of this invention, therefore, to provide a power transfer unit for a tractor extending vertically downwardly from the power take-off shaft which includes a rigid frame having bracing flanges extending vertically therealong, the frame supporting a drive and a driven sprocket, respectively, in a fixed position. The frame for the unit is secured directly to the tractor by brackets interposed between housing structure or other rigid structure carried by the tractor body and the frame for the power transfer unit.

Yet another object is to provide such a transfer unit having a rigid frame where the frame includes a cover member closing the frame so that mechanism carried therein is sealed from dirt and dust.

Another object is to provide a transfer unit that can be mounted on the rear of a tractor by bracing members and a cantilever type support, the driven sprocket for the unit and mechanism connecting the driven sprocket and a groundworking tool being disposed below the connection between the bracing members and the frame of the unit.

These and other objects and advantages are attained by the present invention described hereinbelow in conjunction with the accompanying drawings wherein:

Fig. 1 is a side view of a conventional tractor having a rotary cultivator attachment secured thereto with parts broken away to disclose the power transfer unit of this invention;

Fig. 2 is an end view of a power transfer unit embodying this invention, partly broken away to uncover the interior of the unit; and Fig. 3 is a section taken along the line 3—3 of Fig. 2.

Referring to the drawings wherein an embodiment of this invention is illustrated and with particular reference to Fig. 1, 10 indicates a conventional tractor having a pair of front support wheels 11 and a pair of rear traction wheels 12. In Fig. 1, only the front and rear wheels at the right side of the tractor are seen. Rear traction wheels 12 are spaced laterally to either side of tractor 10 in a conventional manner. Extending between the rear traction wheels is a housing structure 13 supporting the axles for traction wheels 12 and the power train of the tractor for the traction wheels. Centrally of the traction wheels and extending rearwardly of housing structure 13 is a power take-off shaft 14. It should be understood that various manufacturers produce tractors differing somewhat in structural details. However, the arrangement of the parts so far described is common to most modern farm tractors.

Forwardly of the tractor between the rear traction wheels and front support wheels is a cultivator attachment or mulcher 16 positioned beneath the body of the tractor and overlying a row crop to be cultivated. Conventionally, mulcher 16 includes a shaft 17 connected at its forward end through a universal joint (not shown) to the rotatable drive mechanism of the mulcher. Slidably received within the rear end of shaft 17 is an intermediate shaft 18 the forward end of which has a noncircular cross-section so that drive is transmitted from intermediate shaft 18 to shaft 17. Thus, intermediate shaft 18 and shaft 17 provide a positive, nonslip drive to the rotatable drive mechanism of mulcher 16.

The power transfer mechanism of this invention generally comprises a power transfer unit 19 extending vertically downwardly from the power take-off shaft and housing the mechanism transmitting drive from the power take-off shaft to intermediate shaft 18.

More specifically, referring in particular to Figs. 2 and 3, the power transfer unit includes a rigid frame 21 having a pair of laterally spaced bracing flanges 22 and 23, respectively, extending vertically along each side of frame 21. Rotatably carried intermediate the flanges at the top of the frame is a drive sprocket 26, and rotatably carried intermediate the flanges at the base of the frame is a driven sprocket 27.

Power is transmitted from power take-off shaft 14 to drive sprocket 26 by means of a coupling sleeve shaft 28 containing internal splines which engage the external splines on the end of power take-off shaft 14. Coupling sleeve shaft 28 is journaled at the upper end of frame 21 in oil seal bearings 31 and 32 which have their outer races mounted in a bearing housing section 33 secured to the forward side of casing 21. Bearings 31 and 32 are secured in coupling sleeve 28 by suitable means such as snap rings 34 and 36. Drive sprocket 26 is keyed by a key 37 to the rear end of coupling sleeve shaft 28, the sprocket being axially fixed in position by suitable means such as screw 38.

Driven sprocket 27 at the lower end of frame 21 is mounted in much the same manner as drive sprocket 26. A drive shaft 41 of the power transfer unit, having coupling portions 43 and 42 extending forwardly and rearwardly of the frame, respectively, extends through the center of driven sprocket 27. Sprocket 27 and drive shaft 41 are secured for simultaneous rotation by a key similar to key 35 (not shown because it lies behind cover plate 49 in Fig. 2) and screw 44. Driven sprocket 27 is rotatably supported in the frame in a bearing housing section 46 which resembles bearing housing section 33. A pair of oil seal bearings and snap rings (not shown) support drive shaft 41 within bearing housing section 46 in the manner illustrated in connection with coupling sleeve shaft 28 and bearing housing section 33.

Frame 21 includes integral end members 47 and 48 terminating in bracing flanges 22 and 23 for the reception of a cover member or plate 49. Plate 49 is detachably secured to frame 21 by suitable means such as bolts 51. Plate 49 and frame 21 form an enclosed chamber or casing surrounding the drive and driven sprockets of the transfer unit and sealing off the sprockets from dust and foreign matter carried by the air. Preferably, in operation, a supply of lubricant is maintained within the casing extending to a level submerging the lower end of driven sprocket 27. Lubricant is admitted into the casing through a duct 45 and drained from the casing through a drain port 50.

The rearward end of drive shaft 41 is rotatably mounted in a bearing housing section 52 encircling drive shaft 41 and affixed to plate 49 as by bolts 55. An oil seal is provided between bearing housing section 52 and shaft 41 to prevent the leakage of oil from around the rear end of shaft 41.

Referring to Fig. 3, bearing housing section 46 for drive shaft 41 is affixed to frame 21 by bolts 53 extending through the frame and a flange carried by the bearing housing section. Vertical adjustment slots 54 are provided in the flange of bearing housing section 46. A similar set of adjustment slots 61 are provided in flange 63 of bearing housing section 52. Slots 54 and 61 enable bearing housing section 46 and bearing housing section 52 to be adjusted vertically in frame 21 and, in this manner, the vertical adjustment of driven sprocket 27 relative to drive sprocket 26 is provided. An adjustment screw 56 positioned over an abutment 57 of bearing housing section 46 facilitates the vertical adjustment of bearing housing section 46.

A drive chain 58 reeved over drive sprocket 26 and driven sprocket 27 provides a positive drive connection between the drive and driven sprockets. The tension of drive chain 58 may be adjusted by a screw 56. Power is transmitted from driven sprocket 27 and drive shaft 41 to intermediate shaft 18 through a conventional universal joint 67 coupled to coupling portion 43 at the forward end of shaft 41 as by a shear pin 40. Shear pin 40 provides overload protection for the drive mechanism of mulcher 16 and the power transfer unit 19.

Bearing housing sections 33, 46, since they are rigidly secured to frame 21 of the transfer unit, as by bolts 53, relieve power take-off shaft 14 from any strain caused by chain 58 reeved over sprockets 26, 27. The transfer unit itself is rigidly supported on the tractor so that the transfer unit functions to absorb any bending stresses which otherwise would be transferred to the power take-off shaft. Further, it should be noted that bearing housing sections 33, 46 hold each of the shafts carried therein in alignment so that the shafts are prevented from twisting relative to each other.

Referring again to Figs. 2 and 3, a detachable plate 59 is preferably included in the frame for the power transfer unit, plate 59 covering an aperture 60 formed in frame 21. When it is desired to adjust the tension or to inspect the chain 58, plate 59 may be removed to uncover aperture 60. Aperture 60 also accommodates the mounting of chain 58 about the sprockets within the transfer unit by means of the usual connecting link.

In the embodiment illustrated, the power transfer unit is affixed to a tractor by a pair of brace members or plates 62 and 64, respectively. Plates 62, 64 are affixed to frame 21 in a suitable manner, as by bolts 66. The plates extend forwardly and upwardly from the frame 21 to the body of the tractor where they are affixed to housing structure of the tractor. As best seen in Fig. 1 in the embodiment illustrated, the plates are connected to and supported by the tractor by means of the bolts normally used for assembling the axle housing and differential housing of a tractor. In some cases it may be practical to support the power transfer unit on the draw bar support of a tractor or other rigid structure carried at the rear end of a tractor.

It will be noted from the above that the power transfer mechanism of this invention has a number of advantages not present in those known heretofore. Frame 21 together with bracing flanges 22 and 23 form a rigid structure resisting twisting stresses and strains delivered to the mechanism in a direction longitudinally of tractor 10. As noted above, extensive jarring and twisting in this direction are produced by rotatable groundworking tools, of the type described. The sliding connection between shafts 18 and 17 serves to absorb some of the jarring movement. However, under heavy power demand, the shafts tend to become locked together so that considerable vibration is imparted to shaft 18. The forward portion of frame 21 serves to deflect dirt and dust from the mechanism, and preferably the entire mechanism is enclosed by cover plate 49. Frame 21, while resisting shock, functions also to prevent gyration of the drive and driven sprockets. The frame 21 facilitates the use of a cantilever-type support with a frame 21 supported by braces 64 and 66 affixed to frame 21 at points spaced vertically upwardly from driven sprocket 27.

It is claimed and desired to secure by Letters Patent:

1. In combination with a tractor having a body, traction wheels supporting said body, a housing structure supporting said traction wheels, and a power take-off shaft extending rearwardly from said housing structure; a power transfer unit extending vertically downwardly from said power take-off shaft comprising a rigid frame having a pair of laterally spaced bracing flanges, a drive sprocket at the upper end of said rigid frame intermediate said flanges and driven by said power take-off shaft, means rotatably mounting said drive sprocket in said frame and fixing said sprocket from movement other than rotary movement about its axis relative to said frame, a driven sprocket intermediate said flanges at the lower end of said rigid frame, means rotatably mounting said driven sprocket in said frame and fixing said driven sprocket from movement other than rotary movement about its axis relative to said frame, means drivingly connecting said drive and driven sprockets, and a drive shaft nonrotatably secured to said driven sprocket; and means securing said rigid frame to said housing structure comprising bracket members rigidly holding said rigid frame in a substantially upright position and mounted on said housing structure.

2. In combination with a tractor having a body, traction wheels supporting said body, a housing structure supporting said traction wheels, and a power take-off shaft extending rearwardly from said housing structure; a power transfer unit extending vertically downwardly from said power take-off shaft comprising a rigid frame having a pair of laterally spaced bracing flanges, a drive sprocket at the upper end of said rigid frame intermediate said flanges and driven by said power take-off shaft, means rotatably mounting said drive sprocket in said frame and fixing said sprocket from movement other than rotary movement about its axis relative to said frame, a driven sprocket intermediate said flanges at the lower end of said rigid frame, means rotatably mounting said driven sprocket in said frame and fixing said driven sprocket from movement other than rotary movement about its axis relative to said frame, said last mentioned means being adjustable and accommodating vertical positioning of said driven sprocket to various positions of fixed adjustment, chain means drivingly connecting said drive and driven sprockets, and a drive shaft nonrotatably secured to said driven sprocket; and means securing said rigid frame to said housing structure comprising bracket members rigidly holding said rigid frame in a substantially upright position and mounted on said housing structure.

3. In combination with a tractor having a body, traction wheels supporting said body, a housing structure supporting said traction wheels, and a power take-off shaft extending rearwardly from said housing structure; a power transfer unit extending vertically downwardly from said power take-off shaft comprising a rigid frame having a pair of laterally spaced bracing flanges, a drive sprocket at the upper end of said rigid frame intermediate said flanges and driven by said power take-off shaft, means rotatably mounting said drive sprocket in said frame fixing said sprocket from movement other than rotary movement about its axis relative to said frame, a driven sprocket intermediate said flanges at the lower end of said rigid frame, means rotatably mounting said driven sprocket in said frame and fixing said driven sprocket from movement other than rotary movement about its axis relative to said frame, means drivingly connecting said drive and driven sprockets, and a drive shaft nonrotatably secured to said driven sprocket, said drive shaft having coupling portions at each of its ends protruding forwardly and rearwardly, respectively, of said rigid frame; and means securing said rigid frame to said housing structure comprising a pair of bracket plates affixed at one of their ends to opposite sides, respectively, of said rigid frame intermediate said drive and driven sprockets and at the other of their ends to said housing structure.

References Cited in the file of this patent

UNITED STATES PATENTS

| | | |
|---|---|---|
| Re. 21,713 | LeTourneau | Feb. 11, 1941 |
| 1,694,221 | King | Dec. 4, 1928 |
| 1,772,247 | Forrester et al. | Aug. 5, 1930 |
| 2,108,078 | Russell | Feb. 15, 1938 |
| 2,558,822 | Claus | July 3, 1951 |
| 2,616,348 | Ariens | Nov. 4, 1952 |
| 2,624,416 | Larsen | Jan. 6, 1953 |
| 2,712,785 | Severance | July 12, 1955 |
| 2,783,654 | Carnell | Mar. 5, 1957 |